United States Patent Office 3,439,074
Patented Apr. 15, 1969

3,439,074
METHOD FOR PREPARING DESALINATION MEMBRANES
Allan Sharples and William Banks, Edinburgh, Scotland, assignors, by direct and mesne assignments, of one-half each to Arthur D. Little Research Institute, Iveresk, Scotland, and the United States of America as represented by the Secretary of the Interior
No Drawing. Filed Oct. 1, 1965, Ser. No. 492,341
Int. Cl. B29d 27/00
U.S. Cl. 264—41       10 Claims

ABSTRACT OF THE DISCLOSURE

Reverse osmosis membranes are produced by dissolving a cellulosic ester and a swelling agent in an organic solvent, casting the solution in a thin film on a smooth surface, evaporating a portion of the organic solvent at 15° C. or more immersing the membrane in water and heating in water to about 70 to 75° C.

The invention can be illustrated by the following diagram:

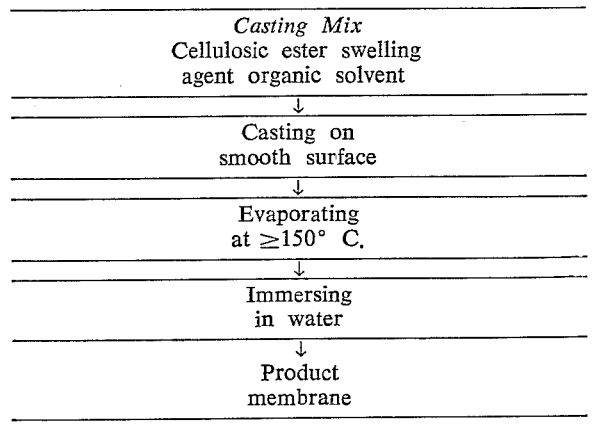

The invention relates to reverse osmosis of aqueous solutions to separate water from solutes. In particular it relates to novel methods for preparing membranes of cellulosic esters such as cellulose acetate for use in reverse osmosis cells.

The reverse osmosis process has attracted considerable interest in the field of sea water purification to produce inexpensive purified water from our most abundant source. The process is of general application in separating water from an aqueous solution with concurrent concentration of the feed stream. In the reverse osmosis process, a pressure in excess of the osmotic pressure of the feed solution is applied to a solution separated from a purified water reservoir by a semipermeable membrane. The direction of water flow observed in the classic osmosis experiment is reversed, and demineralization of the feed solution is accomplished.

In normal operation, the reverse osmosis desalination cell is maintained in continuous operation. The feed solution is introduced under pressure at the high pressure side of the cell and contacted with the membrane surface. The feed solution is circulated across the membrane surface so as to minimize the effects of boundary layer phenomena, and to decrease the solution concentration at the interface of the membrane. A portion of the concentrated feed solution is continuously withdrawn from the cell and may be discarded or utilized as a concentrate. Water passes through the selective osmotic membrane into the low pressure side of the cell and is withdrawn from the system, usually as the desired product. A porous backing between the membrane and the low pressure side of the cell provides a support for the thin film.

Certain membranes, such as cellulosic esters, are permeable to water while rejecting solutes. Although relatively high pressures of the order of 600 to 1,500 p.s.i. or higher are required for reverse osmosis of sea water, good salt rejection and reasonable flux rates have been economically obtained. The development of suitable membranes has progressed rapidly, most of the work being concentrated on the development of cellulose acetate membranes.

The preparation of successful reverse osmosis membranes has been disclosed by Loeb et al. in U.S. Patents 3,133,132 and 3,133,137, issued May 12, 1964. In these patents cellulosic ester membranes are cast from a casting solution comprising a film-forming cellulosic ester polymer, an organic solvent such as acetone, and an aqueous solution of a swelling salt such as magnesium perchlorate. Further information on casting solutions and reverse osmosis procedures is available in the Office of Saline Water Research and Development Report No. 84 by Keilin, published as PB 181571 by the U.S. Department of Commerce on Feb. 20, 1964.

The prior art workers employed low casting temperatures during the preparation of reverse osmosis membranes. Loeb used a low-temperature casting solution and partially evaporated acetone solvent from the cast membrane surface at a temperature of about —8° C. or below. This involved the use of freezer equipment and considerable expense to maintain the low casting temperatures. No successful membranes have been prepared using ambient temperature conditions until the present invention. Also, in a second step of the Loeb process low temperatures are required. This is the immersion step wherein the remaining acetone and some of the swelling salt is removed. Prior art workers used an immersion bath temperature of about 0° C. for the preparation of reverse osmosis membranes. In another aspect of the present invention, the immersion bath is maintained at ambient temperatures. The final step in the preparation of reverse osmosis membranes is the heating step, which has been carried out previously in water above 77° C.

It has been discovered that cellulosic ester membranes suitable for use in reverse osmosis processes for demineralization of aqueous solutions may be prepared by casting and evaporating solvent at room temperature under certain conditions.

Accordingly, it is an object of the present invention to obtain reverse osmosis membranes by a novel process for casting and evaporating solvent at ambient temperatures. It is a further object of this invention to present a novel immersion step for preparing such membranes, and to provide a novel combination of steps for casting, drying, immersing, and heating the cellulosic ester membranes to obtain membranes having high water permeation rates and good salt rejection properties.

In the present invention a method for manufacturing desalination membranes is provided which comprises casting a solution of a film-forming cellulosic ester and a swelling agent in an organic solvent to form a film, partially evaporating the solvent from the film in order to produce a desalination layer on the side of the film in contact with air during casting, immersing the cast film in an aqueous bath consisting essentially of water, with heating if necessary, to remove the swelling agent and solvent and to consolidate the desalination layer and render it more effective, which method is characterized by selecting the concentration of the cellulosic ester and swelling agent and the temperature to which the membrane is heated from ranges which enable a satisfactory membrane to be obtained when casting, solvent evaporation and immersing are effected at room temperature.

The cellulosic ester is preferably cellulose acetate.

The swelling agent may be an aqueous solution of an inorganic perchlorate salt, e.g., magnesium or sodium perchlorate, or other swelling agents such as zinc chloride may be used.

It has been discovered that the process of desalination occurs in a pore-free layer formed during evaporation of the solvent on the side of the membrane in contact with air during casting. The remainder of the membrane may be porous but these pores must be absent in the actual desalination layer.

It has also been discovered that a relationship exists between the useful properties of the membrane (water permeation and salt rejection) and the following process variables:

(a) Concentration of the swelling agent and cellulose acetate in the casting solution;
(b) Temperature and time of casting and evaporating;
(c) Temperature of immersion; and,
(d) Temperature to which the membranes are heated.

The present invention provides two possible methods for preparing membranes at reduced cost, namely: by working at room temperature during the casting and evaporating stage, but retaining low temperature (about 0–2° C.) for the immersion step; and, by working at room temperature for both casting and immersing.

Examples of the preparation of membranes according to the invention will now be described.

EXAMPLE I

A casting solution was prepared at 15° C. from 22.2 gm. cellulose acetate, 66.8 gm. acetone, 10 gm. water and 2 gm. magnesium perchlorate (anhydrous). It was then spread at room temperature with a doctor blade or knife on glass plates fitted with side runners of a height equal to the desired film thickness. The acetone was allowed to evaporate for one minute, and then the film was stripped. The uniform film thickness was equal in this case to .01 inches. By varying the side runner different film thicknesses may be readily obtained.

Partial evaporation of the solvent at about 15° C. and initial organization of the film occurred during one minute period. The film was then immersed in water at 15° C. for 1 hour during which complete removal of the solvent was effected by diffusion into the water. Partial removal of the magnesium perchlorate also took place.

The film was then heated at 73° C. in water for 15 minutes to complete the organization of the film for high flow desalination of sea water.

EXAMPLE II

A casting solution was prepared from 22.2 gm. cellulose acetate, 66.8 gm. acetone, 10 gm. water and 1.1 gm. magnesium perchlorate. The solution was cast for one minute at room temperature, immersed in ice water and heated at 73° C. in an aqueous bath to yield a membrane having high throughput and low salt permeation.

In the above two examples it was determined that salt rejection (decrease in salinity from the feed solution to the effluent) was greater than 94.5% for 3.5% sodium chloride solution.

The water flux rate through the membrane for the first and second examples respectively were 1.3 and 1.4 ml./hr./cm.² of membrane surface for a total applied pressure of 100 atmospheres.

Experiments to modify the casting procedure were carried out using standard cellulose acetate casting dope. Membranes were cast at about 15° C., immersed in ice water (0–2° C.) and then heat-treated at various temperatures. The properties of these membranes are recorded in Table 1. The feed solution to the membranes was 3.5% NaCl at 1500 p.s.i.

TABLE 1.—CHARACTERISTICS OF MEMBRANES PREPARED BY CASTING AT ROOM TEMPEATURE FOR 1 MINUTE, AND IMMERSING IN ICE WATER (0–2° C.)

| Heat treatment | Water flux, ml./hr. | Salt rejection (percent salinity decrease) |
|---|---|---|
| None | 780 | 12 |
| Heated at 62° C | 180 | 90 |
| Heated at 70° C | 120 | 95.5 |
| Heated at 73° C | 112 | 98.5 |
| Heated at 75° C | 104 | 98.6 |
| Heated at 80° C | 64 | 98.4 |

The above data were obtained using a standard membrane casting solution as in Example II and a standard reverse osmosis cell.

The data for salt rejection and flow rate for the membrane heat-treated at 73° C. are virtually identical to the corresponding values for a standard Loeb-type membrane. Thus a slight decrease in the temperature of heat-treatment (from 80° C. to 73° C.) has resulted in the tremendous difference in membrane characteristics.

Having produced from the standard solution a membrane of high quality by casting at room temperature and modifying the subsequent heat-treatment, an attempt was made to carry out *both* casting and immersion at ambient temperatures. The properties of the membranes so obtained are shown in Table 2.

TABLE 2.—CHARACTERISTICS OF MEMBRANES PREPARED BY CASTING AND IMMERSING AT 15° C.

| Time of casting (minutes) | Heat treatment | Water flux rate, ml./hr. | Salt rejection (percent salinity decrease) |
|---|---|---|---|
| 1 | None | 600 | 34 |
|   | Heated at 60° C | 130 | 94 |
|   | Heated at 70° C | 110 | 95.4 |
|   | Heated at 80° C | 56 | 93 |
| 3 | None | 230 | 54 |
|   | Heated at 60° C | 160 | 61 |
|   | Heated at 70° C | 92 | 82 |
|   | Heated at 80° C | 34 | 85 |

In another procedure the casting dope was modified by increasing the amount of swelling agent relative to the other constituents. The properties of membranes prepared at room temperature from these solutions are recorded in Table 3. The casting solution was 22.2 parts by weight of cellulose acetate, 66.8 parts acetone, 10 parts water, and perchlorate as shown. The operating conditions of the standard reverse osmosis cell were again 3.5% NaCl at 1500 p.s.i.

TABLE 3.—CHARACTERISTICS OF MEMBRANES PREPARED BY CASTING AND IMMERSING AT ROOM TEMPERATURE AS A FUNCTION OF Mg(ClO₄)₂ CONCENTRATION

| Mg(ClO₄)₂ (parts by wt.) | Casting time, min. | Temp. of heating, ° C. | Flow rate ml./hr. | Salt rejection, percent |
|---|---|---|---|---|
| 1.5 | 1 | 61 | 130 | 92 |
|     |   | 73 | 90  | 97 |
|     |   | 80 | 56  | 95 |
| 2.0 | 1 | 61 | 130 | 91 |
|     |   | 73 | 102 | 97.1 |
|     |   | 80 | 80  | 97.3 |
|     |   | 61 | 158 | 87 |
|     |   | 73 | 70  | 97 |
|     |   | 80 | 40  | 93 |
| 3.0 | 1 | 61 | 132 | 87 |
|     |   | 73 | 100 | 95 |
|     |   | 80 | 61  | 97.7 |

It has been demonstrated by the foregoing examples and tables that a successful reverse osmosis membrane can be cast under ambient temperature conditions. By decreasing the evaporation or drying time to less than one minute, slightly higher ambients than those disclosed may be utilized, but control of the evaporation rate is difficult at higher temperatures. Also, it has been shown that the particular combination of steps is an important part of the invention. Successful membranes are obtained using ambient drying conditions only when lower heating bath temperatures are employed. This discovery is a significant advance over the prior art and permits the fabrication of reverse osmosis membranes without expensive cooling equipment.

While cellulose acetate has been the most common membrane material used by the prior art workers and is the preferred embodiment of this invention, the acetyl group may be substituted by a suitable acyl radical, such as formyl, propionyl, butyryl, etc. Also, the concept is not limited by the particular casting procedure or membrane compositions disclosed, the only limitations being that the membrane casting compositions comprise a film-forming cellulosic ester, a swelling agent, and a suitable solvent.

What is claimed is:

1. A method for preparing a reverse osmosis membrane comprising:
    dissolving a film-forming cellulosic ester and a swelling agent in an organic solvent,
    casting the above solution to form a membrane,
    evaporating a portion of the organic solvent at an ambient temperature of at least about 15° C. for about 1 minute,
    immersing the cast membrane in water, and
    heating the cast membrane in water at a temperature in the range of about 70 to 75° C.

2. The method of claim 1 wherein the ester is cellulose acetate, and the swelling agent is an aqueous solution of perchlorate salt, and the organic solvent is acetone.

3. The method of claim 2 wherein the cast membrane is heated in water at about 73° C. for about 15 minutes.

4. The method of claim 3 wherein the cast membrane is immersed in water at about 0° C. to ambient temperature.

5. A method for preparing a membrane suitable for use in reverse osmosis demineralization processes comprising:
    casting a solution consisting essentially of about 22.2 parts by weight of cellulose acetate, 66.8 parts acetone, 10 parts water, and about 1 to 3 parts of swelling salt to form a membrane having a substantially uniform thickness up to about 0.01 inches,
    evaporating acetone from one surface of the membrane at a temperature of at least about 15° C. for a period of not more than about 1 minute,
    immersing the cast membrane in an aqueous bath consisting essentially of water at about 0° C. to ambient temperature, and heating the cast membrane in an aqueous bath at a temperature of about 70 to 75° C.

6. The method of claim 5 wherein the swelling salt is magnesium perchlorate, sodium perchlorate, or zinc chloride.

7. The method of claim 6 wherein the swelling salt is magnesium perchlorate.

8. The method of claim 6 wherein the swelling salt is zinc chloride.

9. The method of claim 5 wherein the cast membrane is immersed in water at a temperature of about 15° C.

10. The method of claim 5 wherein the cast membrane is immersed in water at a temperature of about 0 to 2° C.

References Cited

UNITED STATES PATENTS

| | | | |
|---|---|---|---|
| 3,133,132 | 5/1964 | Loeb et al. | 264—49 |
| 3,250,701 | 5/1966 | Watson et al. | 264—49 XR |
| 3,283,042 | 11/1966 | Loeb et al. | 264—49 |

OTHER REFERENCES

Manjikian, S., "Improvement in Fabrication Techniques for Reverse Osmosis Desalination Membranes." Paper presented at the first International Symposium on Water Desalination, Washington, D.C., October 3–9, 1965. pp. 1–10.

U.S. Office of Saline Water, "The Mechanism of Desalination by Reverse Osmosis." Research and Development Progress Report No. 84, November 1963, by Aerojet-General Corp., Washington, D.C., U.S. Dept. of Interior, pp. III–9 to III–11.

U.S. Office of Saline Water, "The Mechanism of Desalination by Reverse Osmosis, and Its Relation to Membrane Structure." Research and Development Progress Report No. 143 by Banks and Sharples, Washington, D.C., U.S. Dept. of Interior, June 1965, pp. 19; 30–35.

PHILIP E. ANDERSON, Primary Examiner.

U.S. Cl. X.R.

210—500; 264—299

U.S. DEPARTMENT OF COMMERCE

PATENT OFFICE

Washington, D.C. 20231

UNITED STATES PATENT OFFICE
CERTIFICATE OF CORRECTION

Patent No. 3,439,074                                                April 15, 1969

Allan Sharples et al.

It is certified that error appears in the above identified patent and that said Letters Patent are hereby corrected as shown below:

Column 1, line 34, "150" should read -- 15 --.

Signed and sealed this 14th day of April 1970.

(SEAL)
Attest:

Edward M. Fletcher, Jr.                            WILLIAM E. SCHUYLER, JR.

Attesting Officer                                            Commissioner of Patents